(12) United States Patent
Yamashita

(10) Patent No.: US 6,666,286 B2
(45) Date of Patent: Dec. 23, 2003

(54) FLUID CIRCULATING APPARATUS FOR DRILL

(75) Inventor: Hideaki Yamashita, Hiroshima (JP)

(73) Assignee: Goei Co., Ltd., Hiroshima (JP)

( * ) Notice: Subject to any disclaimer, the term of this patent is extended or adjusted under 35 U.S.C. 154(b) by 22 days.

(21) Appl. No.: 10/022,919

(22) Filed: Dec. 20, 2001

(65) Prior Publication Data

US 2003/0116354 A1 Jun. 26, 2003

(51) Int. Cl.[7] .................. E21B 21/015; E21B 21/12
(52) U.S. Cl. .................. 175/209; 175/211; 175/213; 210/172; 210/416.1
(58) Field of Search .................. 175/65, 66, 206, 175/207, 209, 211, 213, 216, 217; 210/172, 258, 416.1

(56) References Cited

U.S. PATENT DOCUMENTS

| | | | | |
|---|---|---|---|---|
| 3,766,997 A | * | 10/1973 | Heilhecker et al. | 175/66 |
| 5,104,529 A | * | 4/1992 | Becker | 210/195.1 |
| 5,113,951 A | * | 5/1992 | Houben et al. | 173/75 |
| 5,660,240 A | * | 8/1997 | Harms et al. | 175/209 |
| 5,987,698 A | * | 11/1999 | Koenig et al. | 15/339 |
| 6,126,822 A | * | 10/2000 | Ostermeier et al. | 210/172 |
| 6,216,799 B1 | * | 4/2001 | Gonzalez | 175/5 |
| 6,391,198 B1 | * | 5/2002 | Porter et al. | 210/241 |
| 2002/0027023 A1 | * | 3/2002 | Britz | 175/210 |

FOREIGN PATENT DOCUMENTS

| | | | | |
|---|---|---|---|---|
| DE | 19544892 C1 | * | 3/1997 | A47L/7/00 |
| JP | 5-70911 | | 9/1993 | |
| JP | 6-33420 | | 2/1994 | |

* cited by examiner

Primary Examiner—David Bagnell
Assistant Examiner—T. Shane Bomar
(74) Attorney, Agent, or Firm—Sughrue Mion, PLLC

(57) ABSTRACT

There is provided a fluid circulating apparatus for a drill that requires only a small amount of coolant, as a suspension is collected and reused. The apparatus (1) for use with a drill (2) includes a suspension collecting device (3) that collects a suspension derived from the coolant mixed with chippings (S) through cutting and drilling operations, a suspension filtering device that filters off the chippings included in the suspension, thereby making the resultant coolant to be stored in a reservoir (4a), and a coolant supplying means that supplies the coolant obtained by the suspension filtering device and stored in the reservoir to the bit. The suspension collecting device includes a vacuum pump used to collect the suspension from a water-receiving pad so provided as to surround a point to be drilled by changing a pressure in the reservoir to subatmospheric pressure.

7 Claims, 8 Drawing Sheets

FLUID CIRCULATING APPARATUS FOR DRILL

BACKGROUND OF THE INVENTION

This invention relates to a fluid circulating apparatus for use with a drill that creates holes in concrete, rock, or other materials.

The drill includes a bit that cuts and creates holes in an object to be drilled made of concrete, rock, or other materials, and a bit driving means for imparting a rotary motion to the bit, and allows the bit to rotate on an axis thereof, and to travel along the axis with the bit driving means. Conventionally, such a drilling operation has normally been carried out with water as a coolant (hereinafter referred to as cooling water) supplied via a fluid inlet provided in the bit.

The cooling water not only quenches heat generated by friction between a cutting edge of the bit rotating at high speed and the object to be drilled, but also serves to lubricate the rotating bit and to lessen abrasion of the cutting edge of the bit. Further, cooling water serves to flush out a large number of chippings produced through cutting and drilling operations by the drill.

The cooling water having the above features is normally supplied from a waterworks in a working place, and a considerably large amount of the cooling water is required for completion of the drilling operation.

On the other hand, not every working place has a waterworks equipped sufficiently. Since cooling water is required for carrying out a drilling operation in such a working place as well, operators should arrange in advance water to be used as cooling water in a container such as a bucket or pail. In most instances, the amount of the water prepared for that purpose is inevitably restricted to a minimum due to working place conditions or for reasons of transport.

The drilling operation performed with a limited amount of cooling water would require drilling as many holes as possible using the limited amount of cooling water, and thus would result in an extremely restricted amount of cooling water available for each hole. In many instances, the operation is carried out with a minimum operable amount of cooling water.

However, when the operation is carried out with a minimum operable amount of cooling water, the cutting edge of the bit is likely to become dull. Accordingly, operation time would become longer, and thereby subsequent operations would be affected.

Moreover, since the cooling water is not reused, the minimized amount of water prepared in advance becomes short in most cases. If the cooling water becomes short, an operator need go to a waterworks far from his/her working place to make up water. An interruption thus made during making up the cooling water would result in reduced working efficiency.

If the working place is located high in a high-rise building or the like, the water makeup operation produces sheer physical exhaustion of the operator, to say nothing of extra time required for making up the cooling water. Besides, the operation of carrying heavy water to be made up entails a danger.

Further, the cooling water also serves to flush out chippings produced through the drilling operation, and the cooling water discharged turns into a suspension containing the chippings. Consequently, the drilling operation usually accompanies an operation of collecting the suspension into another container to maintain cleanliness of the working place, and such a collecting operation is very burdensome.

Therefore, it is an exemplified object of the present invention to provide a fluid circulating apparatus for a drill in which a burden on an operator is alleviated by sparing the operator the inconveniences of making up cooling water, even if only a small amount of cooling water is available, and a suspension is collected and reused.

SUMMARY OF THE INVENTION

In order to achieve the above object, there is provided a fluid circulating apparatus for a drill according to the present invention. The drill includes a bit, a bit driving means that drives the bit to rotate, and a fluid inlet used to supply a coolant to the bit; the drill cuts and drills an object to be drilled by rotating the bit while supplying the coolant to the bit. The above fluid circulating apparatus for a drill comprises a suspension collecting means that collects a suspension derived from the coolant mixed with chippings through cutting and drilling operations, a suspension filtering means that filters off the chippings included in the suspension, thereby making the suspension back into the coolant to be stored in a reservoir, and a coolant supplying means that supplies the coolant obtained by the suspension filtering means and stored in the reservoir to the bit. The above suspension collecting means includes a vacuum pump used to collect the suspension through a discharge channel from a water receiving pad so provided as to surround a point to be drilled, while the vacuum pump changes a pressure in the reservoir to subatmospheric pressure.

The coolant is a fluid supplied to the bit for cooling the bit or other purposes, and includes no chippings, or only a trace quantity of chippings.

The suspension is a coolant in which chippings produced by cutting and drilling operations are mixed; thus, the suspension as-is is not suitable for a coolant to be supplied to the bit.

The suspension filtering means passes the suspension to filter off the chippings in the suspension, and thereafter stores the resultant fluid for future use as a coolant in the reservoir.

The present invention has several means for supplying a coolant, collecting a suspension containing chippings, filtering the suspension, and then supplying the filtered fluid as a coolant again. Accordingly, the coolant may be circulated and reused, so that the drilling operation may be performed with a small amount of the coolant.

The vacuum pump used herein to collect the suspension through the discharge channel from the water-receiving pad may contribute to stable collection of the suspension.

Preferably, the fluid circulating apparatus for a drill may further comprise a convection prevention cover between the vacuum pump and a water surface in the reservoir. The convection prevention cover may be disposed in a position where the convection prevention cover may be kept in contact with the water surface in the reservoir.

The convection prevention cover serves to restrict generation of turbidity and convection in the collected suspension. The convection prevention cover also serves as a cover to prevent the suspension from being sucked by the vacuum pump.

The above coolant supplying means may preferably include a pump provided in the reservoir to supply the coolant stored in the reservoir to the bit. The pump may preferably be provided in a floating state on a fluid surface of the coolant to feed a top layer of the coolant to the bit.

The coolant supplying means may preferably include a grain mixing means that mixes the filtered coolant with grains for grinding a cutting edge of the bit.

The grains mixed in the coolant may sharpen the cutting edge of the bit that is likely to become dull.

The suspension collecting means may preferably include a suspension dispersion jig provided at an end of the discharge channel through which the suspension is collected. The suspension dispersion jig includes a cylindrical body part shaped like a cylinder having a bottom end closed, and a branched part that branches out in a predetermined vertical position relative to the closed bottom end of the cylindrical body part. The branched part is shaped like a cylinder having a bottom end closed, and an opening through which the suspension is flown out is formed in the branched part. This structure serves to disperse the suspension uniformly in the filter.

Other objects and further features of the present invention will become readily apparent from the following description of preferred embodiments with reference to accompanying drawings.

DETAILED DESCRIPTION OF THE PREFERRED EMBODIMENTS

Figure 1:
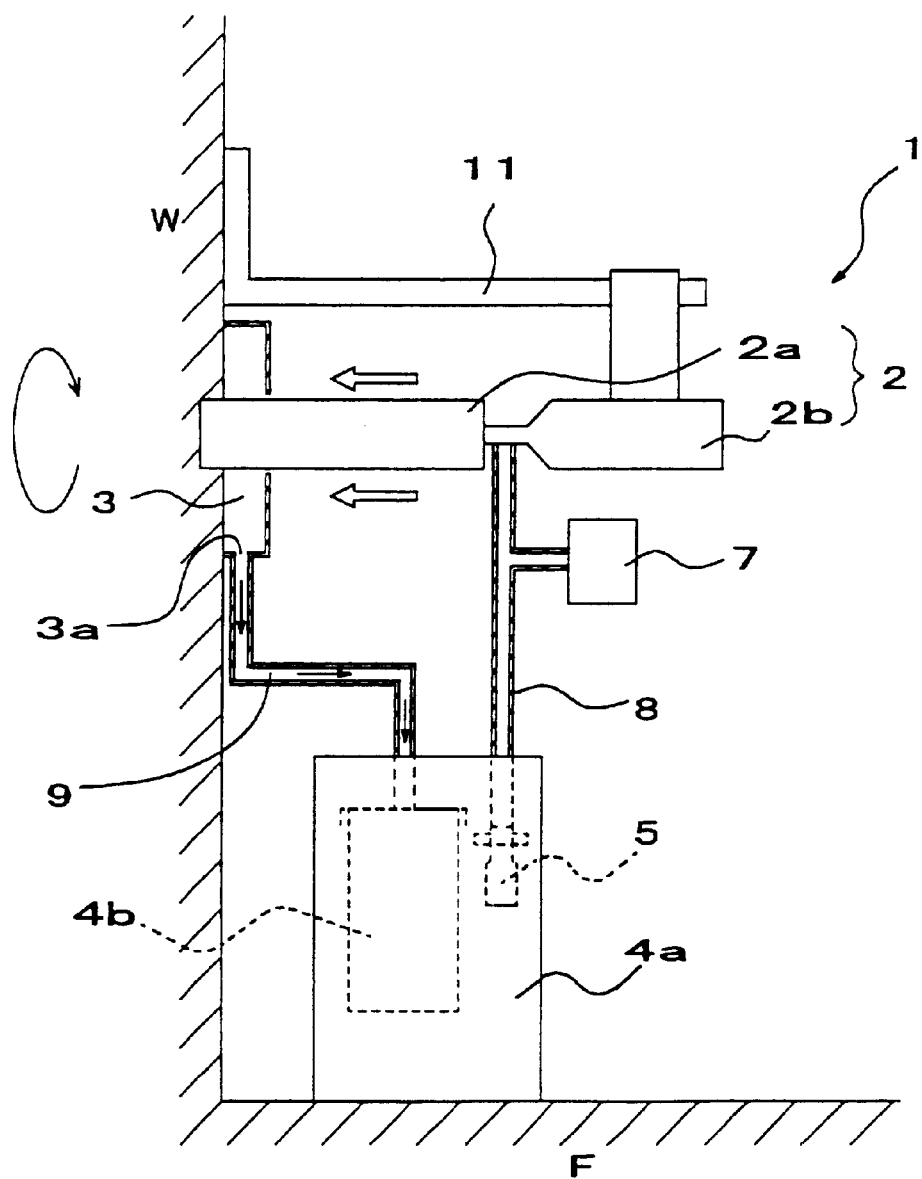
FIG. 1 is a schematic representation of one embodiment of a fluid circulating apparatus for a drill according to the present invention.

A description will now be given of one embodiment of a fluid circulating apparatus for a drill according to the present invention with reference made to the drawings as necessary, by illustrating a cutting and drilling operation in a concrete wall using cooling water by way of example.

It is however to be understood that the fluid circulating apparatus according to the present invention is not limited to the embodiment that will be described herein.

A fluid circulating apparatus 1 according to the present embodiment is used for a drill 2 having a bit 2a driven to rotate by a motor as a bit driving means so as to cut and drill a hole in a wall W as an object to be drilled, and may circulate and reuse cooling water that has once been supplied to the bit 2a during cutting and drilling operations.

This fluid circulating apparatus for a drill 1 includes a suspension collecting means that collects and feeds a suspension via a discharge channel (hose 9) to a suspension filtering means that will be described later, the suspension filtering means that removes chippings S from the suspension, and a coolant supplying means that supplies cooling water obtained through the suspension filtering means via a supply channel (transparent hose 8). Further, the coolant supplying means includes a grain supply device 7 as a grain mixing means for mixing grains for grinding a cutting edge 14 (see FIG. 3) of the bit 2a at some midpoint in the supply channel. Hereupon, the term suspension denotes cooling water containing chippings S produced through cutting and drilling operations.

The fluid circulating apparatus for a drill 1 first collects a suspension using a water receiving pad 3 as a suspension collecting means so provided as to surround a drilling point, and feeds the suspension to the suspension filtering means via the hose 9.

Next, the suspension is let flow into a filter tank 4b that is part of the suspension filtering means via the hose 9, and is filtered through a filter 18 provided in the filter tank 4b, whereby resultant cooling water in which chippings S are eliminated is stored in the reservoir 4a. The suspension filtering means is comprised of the filter tank 4b for filtering the suspension, and the reservoir 4a for temporarily storing the cooling water after filtration.

Further, the stored cooling water is supplied to the bit 2a via the supply channel (transparent hose 8) with a submersible pump 5 that is part of the coolant supplying means provided in the reservoir 4a. In that event, a grain supply device 7 provided in the coolant supplying means supplies a predetermined amount of grains into the transparent hose 8.

Figure 3:
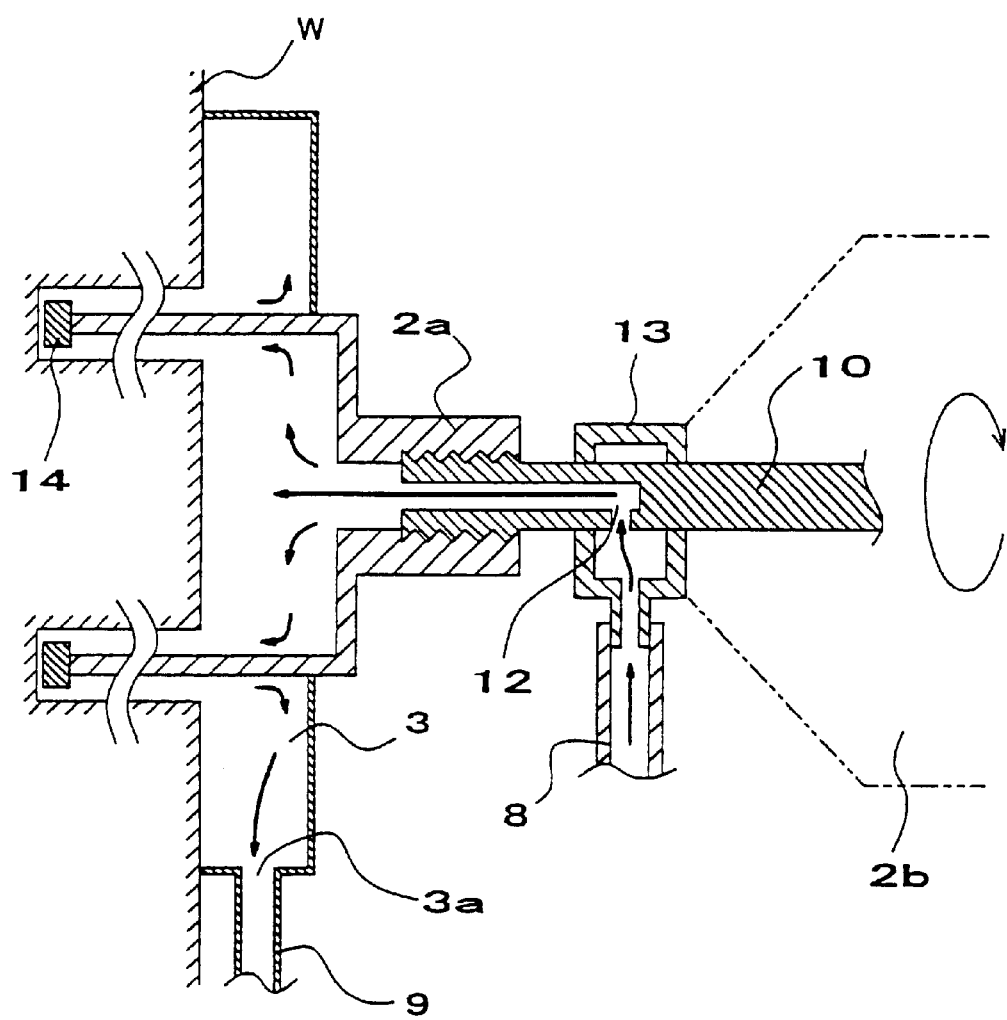
FIG. 3 is a cross-sectional view of a bit during a drilling operation.

In the present embodiment as shown in FIG. 3, a drill 2 includes a bit 2a, a first motor 2b as a drive that rotates the bit about a shaft thereof, and a second motor (not shown) that moves the bit 2a in parallel with the shaft, each motor being under control of a controller (not shown) provided outside.

The bit 2a, a cylindrical component having a thread formed on one end, is engaged with a shaft 10 extending from the first motor 2b, and on a middle portion of the shaft 10 is provided a fluid inlet 12. The second motor is adjoined to the first motor 2b while the controller is provided outside. The drill 2 is attached to a post 11 secured on the wall W, and the drill 2 is thereby fastened (see FIG. 1).

The fluid circulating apparatus for a drill 2 in the present embodiment is attached to and used with the drill 2 when the drill 2 performs a drilling operation, and specifically attached by joining the transparent hose 8 as a cooling water supply channel with the fluid inlet 12 of the bit 2a through a means of attachment 13. Cooling water is fed through the transparent hose 8.

[Suspension Collecting Means]

The suspension collecting means includes the water receiving pad 3 and the hose 9 as a discharge channel, of which the water receiving pad 3 is a box-shaped component enclosing a position around the cutting edge 14 of the bit 2a of the drill 2 fastened through the post 11, and is located on the wall W. In other words, the bit 2a appears to be inserted into the boxy water-receiving pad 3 when the wall W is viewed from the first motor 2b. Enclosing the position around the bit 2a as in the present embodiment makes it possible to collect all the suspensions that might scatter by a rotary action of the bit 2a during cutting and drilling operation.

The hose 9 is connected with a discharge port 3a provided in a lower portion of the water receiving pad 3 to discharge cooling water, and is coupled with the filter tank 4b in the reservoir 4a placed on the floor F near the wall W (FIG. 1).

[Suspension Filtering Means]

Figure 2A:
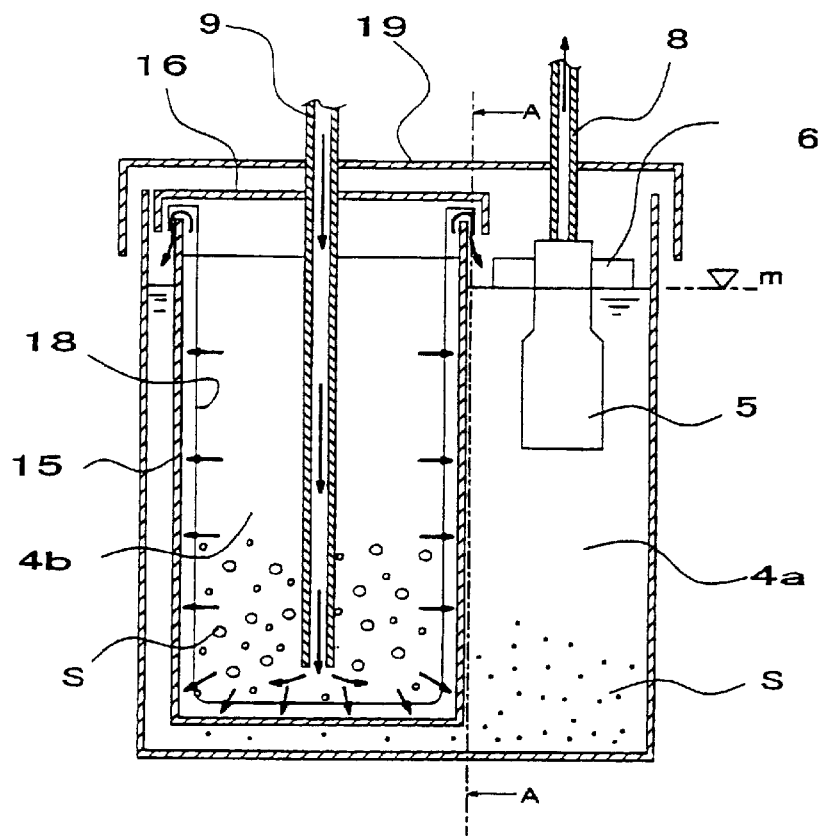
FIG. 2A is a cross-sectional view of a reservoir, filter tank, and submersible pump used for the present embodiment.
Figure 2B:
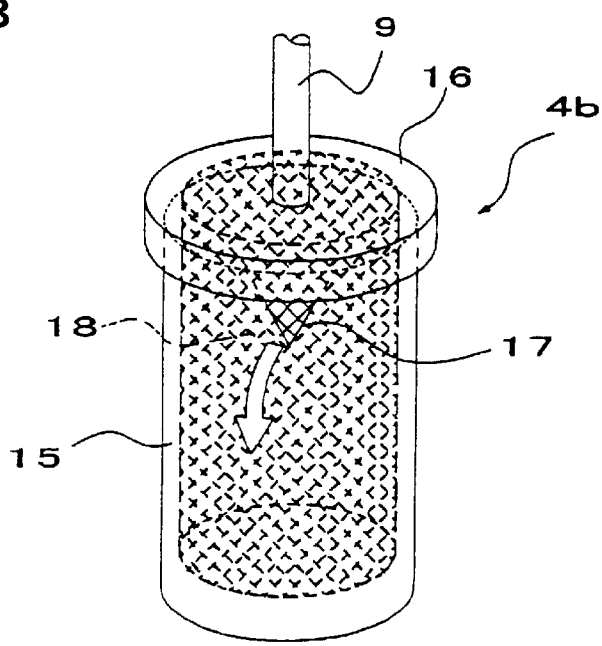
FIG. 2B is a perspective view of the filter tank as shown in FIG. 2A.

The filter tank 4b that is part of the suspension filtering means is as shown in FIG. 2B comprised of a body 15 and a lid 16, and the body 15 is a hollow cylindrical component with an upper end open with the open upper end having a V-shaped indentation or notch 17. The notch 17 serves as an outlet through which cooling water is flown out of the filter tank 4b into the reservoir 4a, the cooling water being obtained through filtration using a nonwoven fabric filter 18 for filtering off chippings S in a suspension flown from the water receiving pad 3 into the filter tank 4b (see FIG. 2A).

An opening of the filter 18 formed in a baggy shape inside the body 15 is detachably attached to the lid 16, and an insertion hole into which the hose 9 is inserted to flow a suspension is provided around a midsection of the lid 16. With the body 15 covered with the lid 16, the hose 9 is inserted through the insertion hole in the lid 16, so that an end thereof is located in the filter 18 shaped like a bag. The baggy filter 18 attached to the lid 16 is larger in volume than the body 15. The volume of the baggy filter 18 is however not limited as far as the effect of the present invention is not spoiled.

The filter tank 4b is used with the lid 16 of the body 15 closed and the hose 9 inserted through the insertion hole. Since the body 15 is provided with the notch 17, cooling water may be flown out while the filter tank 4b is covered with the lid 16. The filter tank 4b is placed in the reservoir 4a. Thus, cooling water filtered and flown out of the notch 17 enters the reservoir 4a and is stored therein.

The reservoir 4a includes an insertion hole of the hose 9, and a lid 19 provided with an insertion hole for the transparent hose 8, and is used with the lid 19 closed. The closed lid 19 serves to prevent impurities of the working place from getting mixed into cooling water in the reservoir 4a.

In the reservoir 4a is provided the submersible pump 5 as a part of the coolant supplying means that supplies cooling water to the bit 2a.

[Coolant Supplying Means]

The submersible pump 5 has a float 6, and is kept in a floating state nearly on a water surface m of the cooling water entering the reservoir 4a from the filter tank 4b. Accordingly, the submersible pump 5 is always positioned nearly on the water surface m in accordance with changes in level of the water surface m. This allows the submersible pump 5 to invariably feed only a top layer of the cooling water stored in the reservoir 4a through the transparent hose 8 to the bit 2a.

The use of the transparent hose 8 may serve to check turbidity of cooling water and to feed the cooling water after filtration to the bit 2a without fail. Further, the use of the transparent hose 8 may provide information on replacement timing of the filter 18 when the cooling water fed out is getting turbid.

Although the submersible pump 5 is provided in a floating state nearly on the water surface m in the present embodiment, the placement of the submersible pump 5 is not limited to that of the present embodiment, and may be any place where the submersible pump 5 may feed the cooling water in the reservoir 4a to the bit 2a. For example, the submersible pump 5 may be located in a lower position in the reservoir 4.

The cooling water fed from the submersible pump 5 travels through the transparent hose 8 to the bit 2a, while the grain supply device 7 located at a midpoint in the transparent hose 8 supplies a predetermined amount of grains into the cooling water. The amount of the grains then is determined as appropriate depending upon a diameter of the bit 2a, or the like.

The supply of the grains to cooling water allows the bit 2a to rotate in the cooling water containing the grains, so that the cutting edge 14 may be ground to regain its sharpness.

As described above, the coolant supplying means includes the submersible pump 5, the transparent hose 8, and the grain supply device 7.

The circulation and reuse of the cooling water permits a sufficient amount of the cooling water to be supplied until the drilling operation is completed, even if only a small amount of water may be prepared. Accordingly, an operator would not encounter a shortage of the cooling water that would require him/her to make up cooling water, so that loads such as physical exhaustion associated by the makeup operation and the operation of carrying heavy water may be eliminated. The suspension is collected and filtered out, and thus the working place may be kept clean.

Even if the present embodiment is used in a location where a water workings is well equipped, the use of a limited amount of cooling water contributes to a reduced cost of construction.

In the fluid circulating apparatus for a drill 1 according to the present embodiment, a nonwoven fabric is used for the filter 18 as the suspension filtering means, but usable filters are not limited thereto; any filter capable of filtering chippings S out may be used regardless of the materials and the like of the filter.

Figure 5:
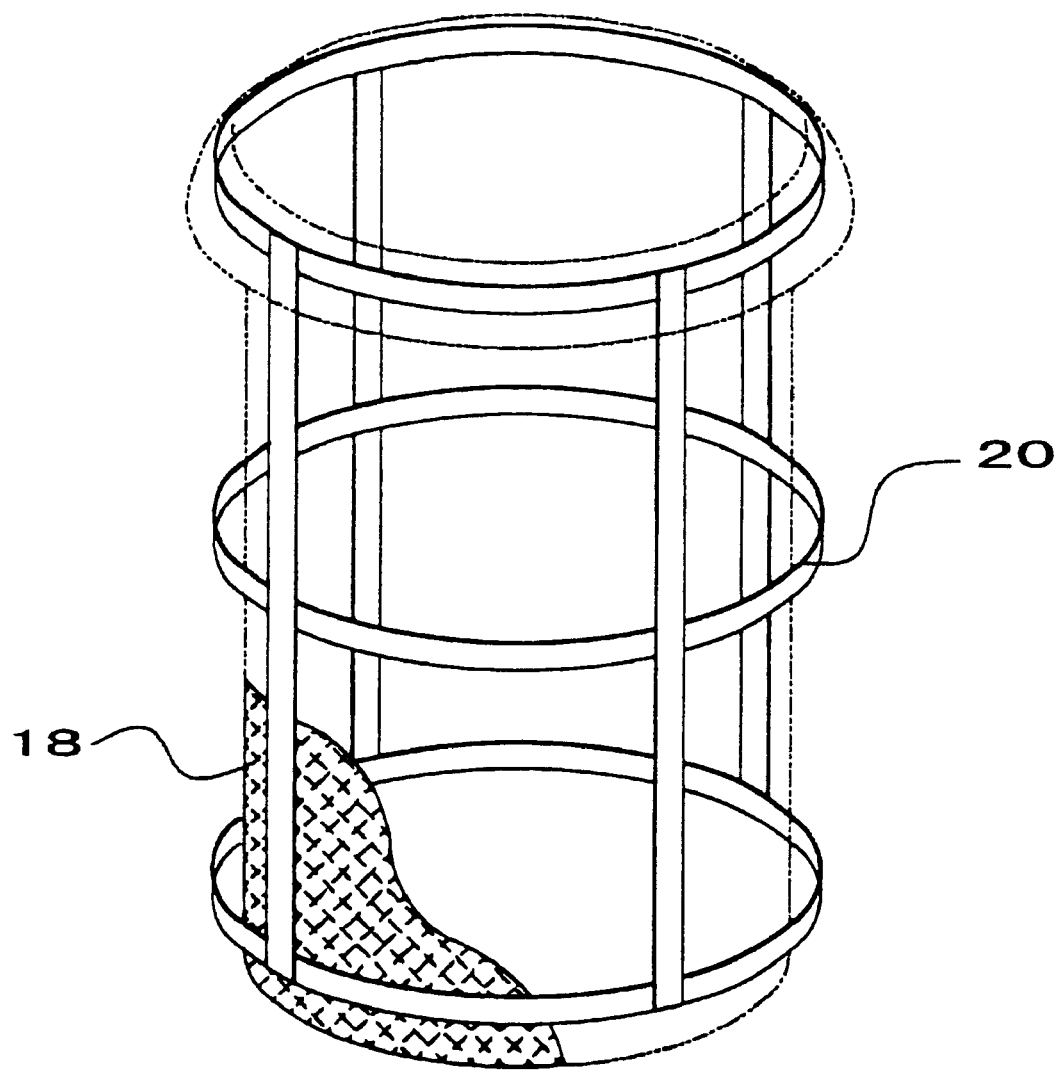
FIG. 5 is an illustration of a basket holding a filter.

Alternatively, the filter 18 may be supported by a basket 20 as shown in FIG. 5, instead of the embodiment in which the filter 18 may be attached to the filter tank 4b. In such an alternative embodiment, cooling water passing through the filter 18 flows out of everywhere in the filter 18 into the reservoir 4a.

Figure 4:
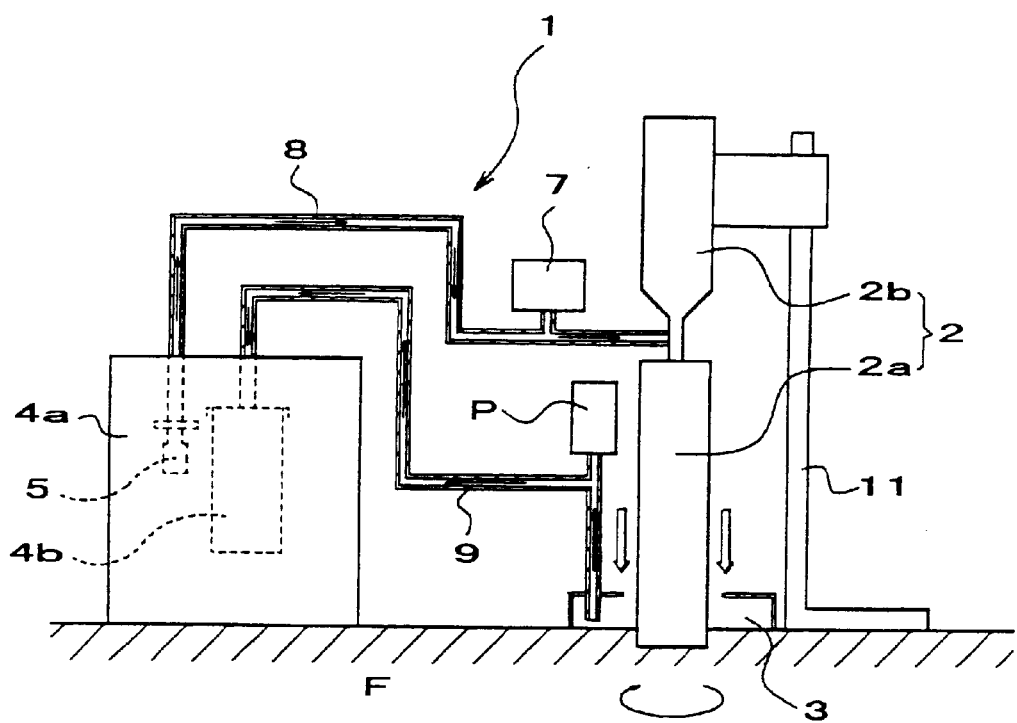
FIG. 4 is a schematic representation of another embodiment of the fluid circulating apparatus for a drill according to the present invention.

In the present embodiment, the wall W is taken as an example of the object to be drilled, but the fluid circulating apparatus for a drill 1 may be used in other places. For instance, as shown in FIG. 4, where a floor F is the object to be drilled, a water receiving pad 3 may be provided around the bit 2a, so that a suspension collected in the water receiving pad 3 may be drawn up with a pump P, and led into the filter tank 4b. The pump P is configured to intermittently pump up the suspension collected in the water-receiving pad 3.

The pump P is operated intermittently because the fluid inlet 12 provided in the bit 2a is too small to supply as much cooling water to the bit 2a as sufficient for continuous pump-up operation of suspensions collected in the water receiving pad 3 with the pump P. To be more specific, if the amount of the suspensions collected in the water receiving pad 3 were sufficient, then continuous pump-up operation would raise no problem, but in actuality the amount of the suspensions collected in the water receiving pad 3 is insufficient; consequently, the pump P would disadvantageously draw up air too while drawing up the suspensions. Air drawn in the pump as above would cause a breakdown. Therefore, the suspensions are drawn up intermittently; thus the pump P may draw up the suspensions when the suspensions are sufficiently collected in the water receiving pad 3, while preventing air from flowing in the pump P.

The suspension thus led into the filter tank 4b is to be supplied as cooling water to the bit 2a with the coolant supplying means, as discussed above.

As described above, no matter where the object to be drilled is located, as far as the suspension collected in the water receiving pad 3 may be led into the filter tank 4b, the present invention is applicable.

A description will now be given of a circulation of cooling water when the thus-configured fluid circulating apparatus for a drill 1 is used to cut and drill a wall W.

A predetermined amount of cooling water is stored in the reservoir 4a in advance.

The bit 2a driven to rotate by the first motor 2b travels toward the wall W by the second motor to drill the wall W. In that event, the cooling water fed by the submersible pump provided in the reservoir 4a enters through the inlet 12 of the shaft 10 engaged with the bit 2a and reaches the cutting edge 14. The cooling water that has reached the cutting edge 14 serves to cool a drilled spot, to improve lubricity between the cutting edge 14 and the concrete wall, and to flush away chippings S produced by the drilling operation.

The cooling water is mixed with the chippings S produced by the drilling operation with the bit 2a in the wall W, and becomes a suspension, which is then collected in the water receiving pad 3 surrounding the bit 2a, and gathers toward a lower position by gravitation. Since the water receiving pad 3 is provided with the discharge port 3a in a position lower than the bit 2a, the suspension that has gathered toward the lower position is discharged spontaneously from the discharge port 3a, and flows through the hose 9 as a discharge channel into the filter tank 4b.

At that time, the filter tank 4b is in a closed state where the body 15 is covered with the lid 16. The suspension passes through the hose 9 inserted through the lid 15, and enters the filter 18 that is shaped like a bag and fixed in the filter tank 4b. The suspension that has entered the filter 18 passes through the filter 18, and flows out through the notch 17 of the body 15 into the reservoir 4a in which the suspension is stored temporarily. When the suspension passes through the filter 18, chippings S larger than gaps among fibers of nonwoven fabric in the suspension cannot pass through the filter 18. Thus, the suspension is filtered with the filter 18 to remove almost all of the chippings S and may be used as cooling water.

The lid 16 of the filter tank 4b may be opened so that the filter 18 having collected chippings S may easily be replaced with an unused filter.

The cooling water that has passed through the filter 18 is stored temporarily in the reservoir 4a.

Most of the chippings S have been removed from the cooling water stored in the reservoir 4a to the extent that the resultant water may be reused for cooling water, as the cooling water has passed through the filter 18 in the filter tank 4b. However, the chippings S have not been removed completely. This is because the chippings include some fine particles that may pass through the filter 18; consequently, the chippings S in the suspension are difficult to remove completely.

Therefore, the cooling water is temporarily stored in the reservoir 4a, so that fine-grained chippings S still remaining in the cooling water may be precipitated at a bottom in the reservoir 4a.

The thus-stored cooling water is supplied to the bit 2a using the submersible pump 5 placed in the reservoir 4a. In that event, the submersible pump 5 is floating nearly on the water surface m of the cooling water as described above, and thus the submersible pump 5 feeds an upper layer of the cooling water having reduced amounts of impurities such as chippings S to the bit 2a.

The cooling water fed with the submersible pump 5 is supplied again to the bit 2a through the transparent hose 8. The cooling water is supplied to the bit 2a together with grains provided by the grain supply device 7 placed at a midpoint in the transparent hose 8.

Next, a description will be given of another embodiment of the fluid circulating apparatus for a drill according to the present invention with reference made to FIGS. 6 and 7 as necessary, by illustrating a cutting and drilling operation in a concrete floor using cooling water by way of example. The same elements as described in FIGS. 1 through 5 are designated by the same reference numerals, and a duplicate description will be omitted herein.

Figure 6:
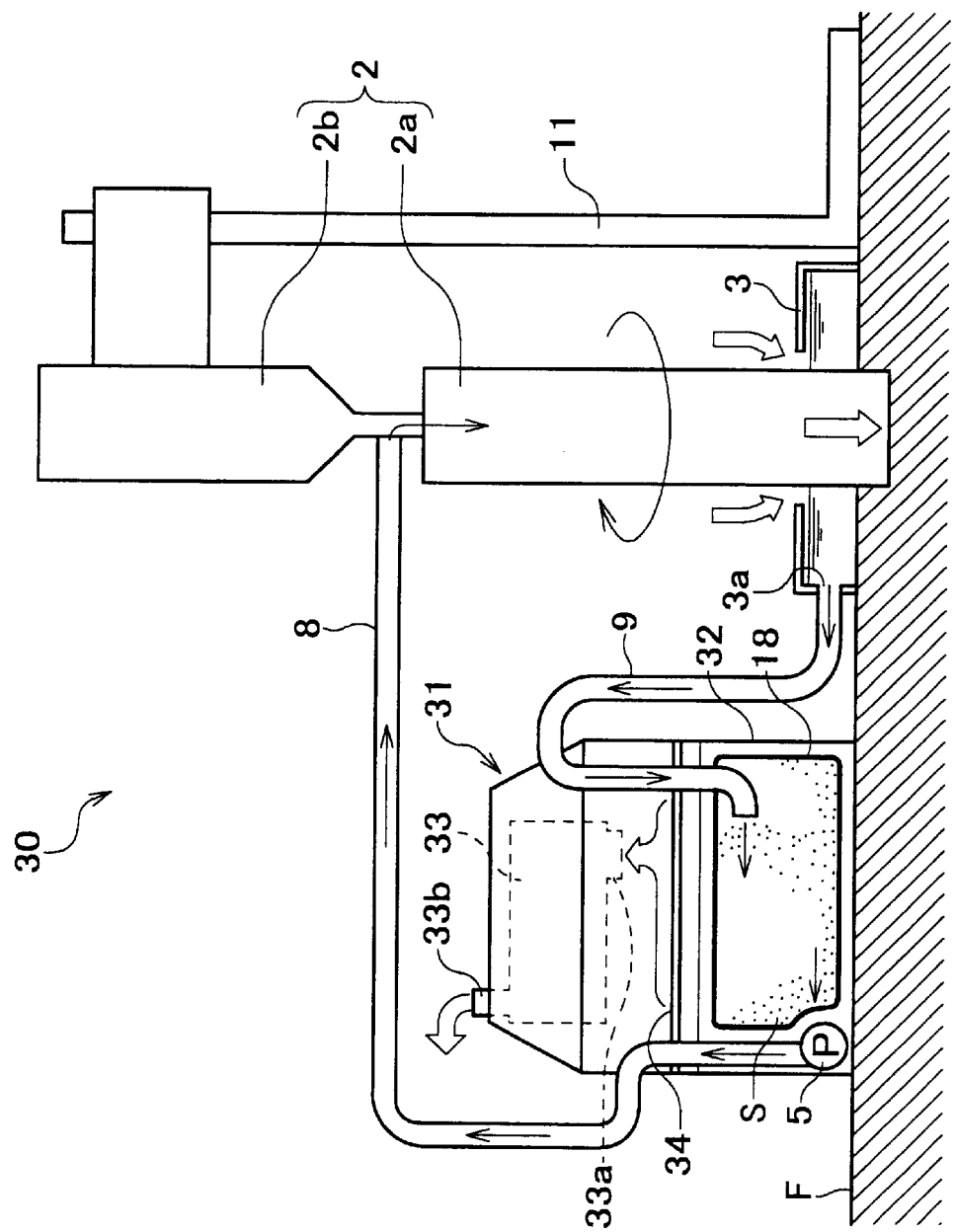
FIG. 6 is a schematic representation of an embodiment of the fluid circulating apparatus for a drill according to the present invention, in which a vacuum pump is used.

As shown in FIG. 6, a fluid circulating apparatus for a drill 30 includes a bit 2a, a drill 2 having a first motor 2b, a suspension collecting means, a suspension filtering means, and a coolant supplying means.

The suspension collecting means is configured to collect a suspension from a water receiving pad 3 through a hose (discharge channel) 9 into a reservoir 32 using a vacuum pump 33 attached to an upper portion of the reservoir 32. The vacuum pump 33 sucks air in the reservoir 32 through a suction port 33a, and discharges the air through a discharge port 33b out of the reservoir 32. By the action of the vacuum pump 33, an atmospheric pressure in the reservoir 32 is reduced to subatmospheric pressure, so that the suspension (and air) in the water receiving pad 3 is collected into the reservoir 32.

Moreover, between the vacuum pump 33 and the water surface in the reservoir 32 is provided a convection prevention cover 34 serving to restrict generation of turbidity and convection in the collected suspension. The convection prevention cover 34 is located in a position where the convection prevention cover 34 may be kept in contact with the water surface m in the reservoir 32, or at a predetermined distance from the water surface m. The convection prevention cover 34 also serves as a cover to prevent the suspension from being sucked by the vacuum pump 33. The convection prevention cover 34 is not necessarily required when the vacuum pump 33 has sufficient capability or may be adjusted appropriately so that the turbidity and convection of the suspension may not affect circulation and filtration performance.

Further, an opening of the hose 9 in the filter tank is located in the filter 18 shaped like a bag. The filter 18 is attached near the opening of the hose 9 with an opening of the filter closed, and placed inside a basket 20 that is a support means as shown in FIG. 5.

In FIG. 6, the opening of the hose 9 in the filter tank is located or submerged under the water surface m in the reservoir 32, but may be located above the water surface m over the unclosed opening of the filter 18 (or the opening of the hose 9 may be located in the filter 18 and above the water surface m).

A description will be given of an operation of the fluid circulating apparatus for a drill 30 having a structure as shown in FIG. 6. The bit 2a driven to rotate by the first motor 2b travels along a shaft toward a floor by the second motor (not shown) to perform a drilling operation. In that event, the submersible pump 5 in the reservoir 32 is actuated to supply cooling water to the cutting edge 14 (see FIG. 3) and to change an atmospheric pressure in the reservoir 32 to subatmospheric pressure. When the pressure in the reservoir 32 lowers below the subatmospheric pressure, a suspension mixed with chippings S produced during a drilling operation is sucked and collected through the hose 9 into the filter 18, provided that cooling water is being supplied into the water receiving pad 3. When the suspension is collected, air in the water-receiving pad 3 is also collected. The collected air above the water surface m passing through the convection prevention cover 34 is exhausted out through the discharge port 33b to the outside of the reservoir 32.

The suspension collected in the reservoir 32 is filtered, and chippings S remaining in the filter 18 are removed as shown in FIGS. 1 through 5, so that the resultant fluid may be circulated again as cooling water. The structure of the vacuum pump 33 integrated with (incorporated in) the reservoir serves to make the fluid circulating apparatus for a drill 30 compact.

Figure 7:
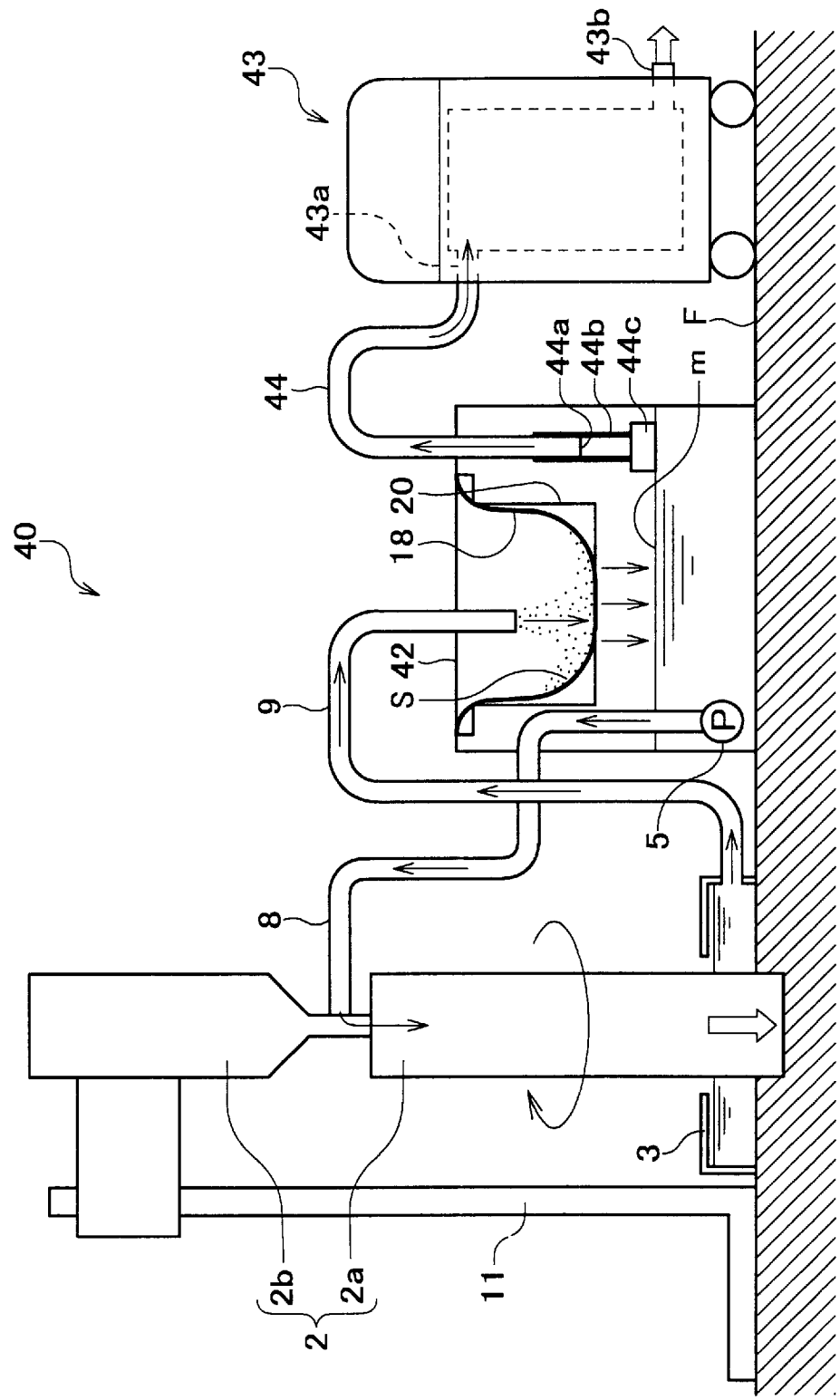
FIG. 7 is a schematic representation of another embodiment of the fluid circulating apparatus for a drill according to the present invention, in which a vacuum pump is used.

Alternatively, as shown in FIG. 7, a vacuum pump 43 in a fluid circulating apparatus for a drill 40 may be disposed in a position apart from a reservoir 42.

To be more specific, the reservoir 42 supports the filter 18 at an upper side so that the filter 18 may be disposed above the water surface m. In the filtrate obtained from filtration of a suspension with the filter 18 in the reservoir 42, the submersible pump 5 is disposed.

Above the water surface in the reservoir 42 is disposed an opening 44a of a suction hose 44 connected to a vacuum pump 43. The suction hose 44 includes a safety relief valve 44c disposed through a guide member 44b in a floating state on the water surface m in such a manner that the opening 44a may be flexibly opened and closed. In the vacuum pump 43, air sucked through the suction hose 44 into the suction port 43a is exhausted through the discharge port 43b.

When the fluid circulating apparatus for a drill 40 as in FIG. 7 is actuated, an atmospheric pressure in the reservoir 42 is reduced to subatmospheric pressure by suction of the vacuum pump 43; thus the suspension and air in the water receiving pad 3 are sucked through the hose 9 toward the filter 18 in the reservoir 42 and collected. The suspension collected in the filter 18 are filtered and accumulated on the bottom of the reservoir 42. Then, a filtrate obtained from filtration of the suspension is supplied to the drill 2 with the submersible pump 5.

As described above, the fluid circulating apparatus for a drill 40 includes the vacuum pump 43 separately from the reservoir 42, and may thus be adjusted to the construction scale inexpensively only by changing the volume of the reservoir 42.

Figure 8:
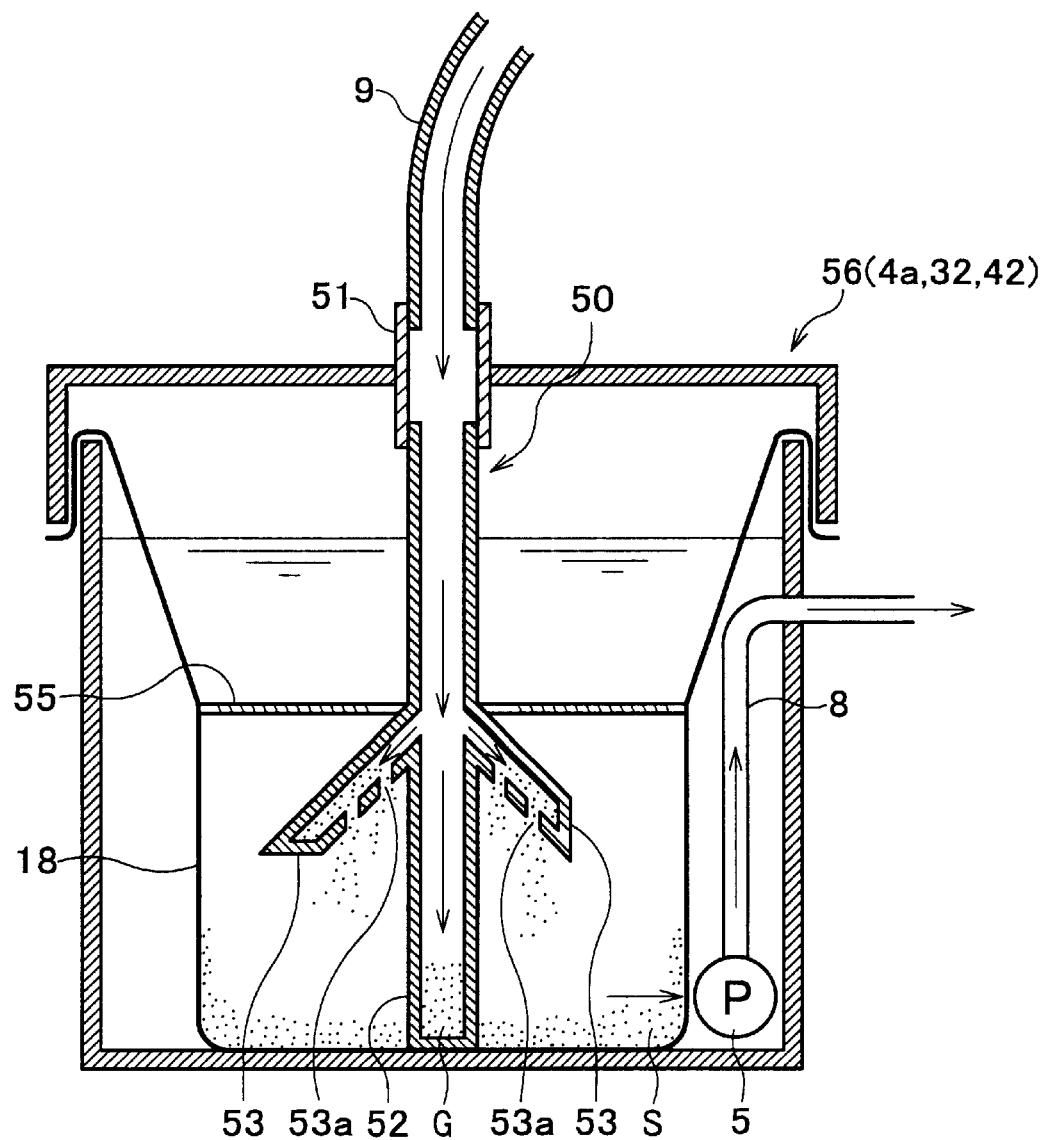
FIG. 8 is a cross-sectional view of a suspension dispersion jig of the fluid circulating apparatus for a drill according to the present invention.

Each fluid circulating apparatus for a drill as shown in FIGS. 1–7 may preferably be modified as shown in FIG. 8, where a suspension dispersion jig 50 is connected via a coupling 51 to an distal end of the hose 9 disposed inside the reservoir 56 (4a, etc.). The suspension dispersion jig 50 serves to uniformly disperse the suspension in the filter 18 and to avoid concentration of clogging in the filter 18. The suspension dispersion jig 50 also serves to collect in advance heavy weight chippings G containing metal materials having a large mass, as well as nonmetal materials having a large volume and thus a large mass.

To be more specific, the suspension dispersion jig 50 includes a cylindrical body part 52 that has a bottom end closed and is formed in the middle of the suspension dispersion jig 50, and a plurality of branched parts 53 that are each attached to a predetermined vertical position (substantially in the midsection in the drawing) of the cylindrical body part 52. Each branched part 53 is attached in such a position that heavy weight chippings G entering the cylindrical body part 52 may not rise with the rapid flow of suspension to be fed. Each branched part 53 branches out from the cylindrical body part 52 obliquely so as to orient a lower end thereof outwardly, and provided with a plurality of openings 53a at an inner side thereof (i.e., a side facing the cylindrical body part 52). Moreover, the openings 53a are positioned a predetermined distance above the bottom of the branched portion 53. Each branched part 53 is so formed as to have a smaller diameter than the cylindrical body part 52 does.

When the suspension dispersion jig 50 is placed, the bottom of the cylindrical body part 52 is supported on the bottom of the reservoir 52, and the convection prevention means 55 that is discal in shape and partially constituted of nylon screen is attached to a midsection of the filter 18. The nylon screen of the convection prevention means 55 has a mesh about ten times coarser (150–170 μm) than the filter 18. The reservoir 56 holds the filter 18 by putting an edge of the opening between a lid and a housing.

A description will next be given of an operation of the suspension dispersion jig 50. As shown in FIG. 8, when suspensions are fed through the hose 9, the suspensions are first fed to the cylindrical body part 52 and then to the branched part 53 in sequence. In that event, among various components in the suspension, heavy weight chippings G containing both of metal materials having a large mass and nonmetal materials having a large volume and thus a large mass are accumulated on the bottom of the cylindrical body part 52. Then, fine chippings S such as sludge contained in the suspensions that successively come in are fed toward the filter 18. The suspensions fed into the filter 18 are filtered and the chippings S are filtered off with the filter 18; the resultant water after filtration is supplied again as a coolant with the submersible pump 5.

The convection prevention means 55 is provided in the suspension dispersion jig 50 so that the filter 18 may be separated into upper and lower parts by the convection prevention means 55. Accordingly, finer chippings S in the suspensions pass through the nylon screen and move to the upper part of the filter 18 by convection generated in the filter 18 to some extent, and then the chippings S are filtered off with the filter 18. On the other hand, coarser chippings S, which cannot pass through the convection prevention means 55, are adsorbed onto a side of the lower part of the filter 18 (or filtered off with the filter 18).

Although the preferred embodiments of the present invention have been described above, various modifications and changes may be made in the present invention without departing from the spirit and scope thereof.

The fluid circulating apparatus for a drill according to the present invention as discussed above are used by attaching to a drill, and includes means for collecting, filtering, and supplying cooling water. Therefore, a small amount of water may be supplied as a sufficient amount of cooling water during drilling operation. This may serve to improve drilling efficiency, to shorten working time, and to reduce loads on an operator such as physical exhaustion accompanied with water makeup operation, and a risk during transport of a heavy weight matter. Moreover, since the suspension is collected and filtered, the working place may be beautifully maintained. Further, grains mixed in the cooling water to be supplied may serve to grind the cutting edge of the bit, serving to achieve improved drilling efficiency, which serves to further shorten the working time.

Provision of the vacuum pump in the suspension collecting means permits collection of the suspension without interposition of the vacuum pump throughout the suspension collecting route; thus passage of the suspension through the inside of the vacuum pump during the collection of the suspension may be avoided, and deterioration of the vacuum pump is never expedited. Moreover, the use of the vacuum pump constantly allows the suspension to be stably supplied from a position of the water-receiving pad to the suspension filtering means. Further, the use of vacuum pump advantageously places no limitation on the positioning of the water receiving pad and the bit, or shape of the water receiving pad.

Furthermore, provision of the suspension dispersion means in the fluid circulating apparatus for a drill allows clogging to be uniformly distributed throughout the filter, so that a life span of the filter may be extended. The heavy weight chippings contained in the suspension may be collected in a bottom portion of the cylindrical body part, and thus the filter may be prevented from being deteriorated at an earlier stage.

What is claimed is:

1. A fluid circulating apparatus for a drill, the drill including a bit, a bit driving means that drives the bit to rotate, and a fluid inlet used to supply a coolant to the bit, whereby the drill cuts and drills an object to be drilled by rotating the bit while supplying the coolant to the bit, wherein the fluid circulating apparatus for a drill comprises:

a suspension collecting means that collects a suspension derived from the coolant mixed with chippings through cutting and drilling operations;

a suspension filtering means that filters off the chippings included in the suspension, thereby making a resultant coolant, in which the chippings have been eliminated, to be stored in a reservoir; and a coolant supplying means that supplies the coolant obtained by the suspension filtering means and stored in the reservoir to the bit, and wherein the suspension filtering means includes a filter tank for filtering the suspension and the reservoir for temporarily storing the resultant coolant after filtration, wherein the filter tank is disposed in the reservoir and, wherein the suspension collecting means includes a water receiving pad and a discharge channel, one end of the discharge channel being coupled with the water receiving pad and another end of the discharge channel being coupled with the filter tank.

2. A fluid circulating apparatus for a drill according to claim 1, wherein the coolant supplying means includes a pump provided in the reservoir to supply the coolant stored in the reservoir to the bit.

3. A fluid circulating apparatus for a drill according to claim 2, wherein the pump is provided in a floating state on a fluid surface of the coolant to feed a top layer of the coolant to the bit.

4. A fluid circulating apparatus for a drill the drill including a bit, a bit driving means that drives the bit to rotate, and a fluid inlet used to supply a coolant to the bit, whereby the drill cuts and drills an object to be drilled by rotating the bit while supplying the coolant to the bit, wherein the fluid circulating apparatus for a drill comprises:

a suspension collecting means that collects a suspension derived from the coolant mixed with chippings through cutting and drilling operations;

a suspension filtering means that filters off the chippings included in the suspension, thereby making a resultant coolant, in which the chippings have been eliminated, to be stored in a reservoir;

a coolant supplying means that supplies the coolant obtained by the suspension filtering means and stored in the reservoir to the bit, wherein the suspension collecting means includes a vacuum pump used to collect the suspension through a discharge channel from a water receiving pad so provided as to surround a point to be drilled, the vacuum pump changing a pressure in the reservoir to subatmospheric pressure; and a convection prevention cover between the vacuum pump and a water surface in the reservoir.

5. A fluid circulating apparatus for a drill according to claim 4, wherein the convection prevention cover is disposed in a position where the convection prevention cover may be kept in contact with the water surface in the reservoir.

6. A fluid circulating apparatus for a drill the drill including a bit, a bit driving means that drives the bit to rotate, and a fluid inlet used to supply a coolant to the bit, whereby the drill cuts and drills an object to be drilled by rotating the bit while supplying the coolant to the bit, wherein the fluid circulating apparatus for a drill comprises:

a suspension collecting means that collects a suspension derived from the coolant mixed with chippings through cutting and drilling operations;

a suspension filtering means that filters off the chippings included in the suspension, thereby making a resultant coolant, in which the chippings have been eliminated, to be stored in a reservoir;

a coolant supplying means that supplies the coolant obtained by the suspension filtering means and stored in the reservoir to the bit, wherein the coolant supplying means includes a grain mixing means that mixes the filtered coolant with grains for grinding a cutting edge of the bit.

7. A fluid circulating apparatus for a drill, the drill including a bit, a bit driving means that drives the bit to rotate, and a fluid inlet used to supply a coolant to the bit, whereby the drill cuts and drills an object to be drilled by rotating the bit while supplying the coolant to the bit, wherein the fluid circulating apparatus for a drill comprises:

a suspension collecting means that collects a suspension derived from the coolant mixed with chippings through cutting and drilling operations;

a suspension filtering means that filters off the chippings included in the suspension, thereby making a resultant coolant, in which the chippings have been eliminated, to be stored in a reservoir;

a coolant supplying means that supplies the coolant obtained by the suspension filtering means and stored in the reservoir to the bit, wherein the suspension collecting means includes a suspension dispersion jig provided at an end of the discharge channel through which the suspension is collected, and wherein the suspension dispersion jig includes a cylindrical body part shaped like a cylinder having a bottom end closed, and a branched part that branches out in a predetermined vertical position relative to the closed bottom end of the cylindrical body part, the branched part being shaped like a cylinder having a bottom end closed, an opening through which the suspension is flown out being formed in the branched part.

* * * * *